US006702873B2

(12) United States Patent
Hartman

(10) Patent No.: US 6,702,873 B2
(45) Date of Patent: Mar. 9, 2004

(54) HIGH PARTICLE SEPARATION EFFICIENCY SYSTEM

(75) Inventor: Peter A. Hartman, Wayne, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/128,221

(22) Filed: Apr. 23, 2002

(65) Prior Publication Data

US 2003/0196548 A1 Oct. 23, 2003

(51) Int. Cl.[7] .............................................. B01D 45/04
(52) U.S. Cl. ...................... 95/8; 95/31; 55/434; 96/417
(58) Field of Search ........................ 95/8, 31; 55/385.2, 55/306, 434; 96/417; 60/39.092; 137/15.1

(56) References Cited

U.S. PATENT DOCUMENTS

| 3,338,049 A | * | 8/1967 | Fernberger ............... 60/39.092 |
| 3,436,910 A | | 4/1969 | Haworth |
| 3,521,431 A | | 7/1970 | Connors et al. |
| 3,534,548 A | | 10/1970 | Connors |
| 3,733,814 A | | 5/1973 | Hull, Jr. et al. |
| 3,993,463 A | | 11/1976 | Barr |
| 4,004,760 A | | 1/1977 | Ando et al. |
| 4,190,217 A | | 2/1980 | O'Connor |
| 4,250,703 A | | 2/1981 | Norris et al. |
| 4,397,431 A | | 8/1983 | Ben-Porat |
| 4,509,962 A | | 4/1985 | Breitman et al. |
| 4,617,028 A | | 10/1986 | Ray et al. |
| 5,039,317 A | | 8/1991 | Thompson et al. |
| 5,123,240 A | | 6/1992 | Frost et al. |
| 5,222,693 A | | 6/1993 | Slutzkin et al. |
| 5,279,109 A | | 1/1994 | Liu et al. |

* cited by examiner

Primary Examiner—Robert A. Hopkins
(74) Attorney, Agent, or Firm—David J. Clement

(57) ABSTRACT

An inertial inlet particle separator system (14) for a vehicle engine (12) is provided. The system (14) includes a particle sensor (60) that generates a contamination signal. An inertial inlet particle separator (56) is also included in the system (14) and has a fluid parameter adjusting system (58) mechanically coupled within the inertial inlet particle separator (56). A controller (62) is electrically coupled to the particle sensor (60) and the clean fluid parameter adjusting system (58). The controller (62) adjusting a fluid parameter of the inertial inlet particle separator (56) in response to the contamination signal. A method of performing the same is also provided.

21 Claims, 3 Drawing Sheets

HIGH PARTICLE SEPARATION EFFICIENCY SYSTEM

TECHNICAL FIELD

The present invention relates generally to aeronautical vehicle systems, and more particularly to a method and apparatus for separating particles from an induced fluid within an aeronautical vehicle engine.

BACKGROUND OF THE INVENTION

Figure 5:
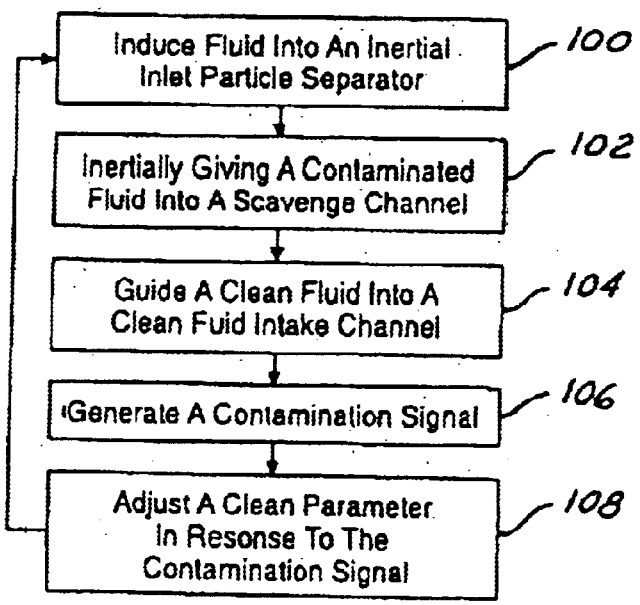

During operation of an aeronautical vehicle, fluids are forced into an engine and are used to generate energy to propel the vehicle. The fluids may contain undesirable particles, such as sand and dust, which can cause degradation of engine components. In order to prevent the degradation of engine components, the undesirable particles are separated from the fluids using an inertial inlet particle separator.

Referring now to FIG. 1, a quarter cross-sectional view of a traditional inertial inlet particle separator 10 is shown. The separator 10 includes a duct system 12 having a scavenge channel 14 that forms an in-line fluid path with a fluid inlet 18, represented by arrow 16, and a clean intake channel 20 that branches off from the in-line fluid path 16. The duct system 12 is divided via a splitter 22 to form the scavenge channel 14 and the clean intake channel 20. A clean intake channel opening 24 is defined by the splitter 22 on a first side 26 and a hub 28 on a second side 30.

Fluid contaminated with particles has a higher inertia than fluid without particles. This being the case, contaminated fluid tends to flow straight into the scavenge channel 14 rather than over and around the hub 28, which has a radius of curvature with a tangential angle 32. The angle 32 is generally defined by two vectors lying tangentially on the innermost curvatures of side 30, intersecting over hub 28 at a point 36. The contaminated fluid is guided from the scavenge channel into a blower where it is then discharged. Relatively, uncontaminated fluid flows into the clean intake channel 20, over the hub 28, where it is then further guided into the engine. Approximately, 15–25% of the fluid entering the fluid inlet 18, containing larger captured particles, enter the scavenge channel 14, while the remaining fluid and lighter particles enters the clean intake channel 20. Thus, a small percentage of particles enter the engine through the clean intake channel 20, thereby protecting engine componentry.

Particle separation efficiency may be minimally increased by decreasing the size of the clean intake channel opening 24 or by decreasing the angle 32 between a fluid inlet portion 34 of the system 12 and the hub 28. While both methods of increasing efficiency are effective, both methods have an adverse effect of raising the pressure loss of the air entering the engine, with an attendant decrease in power and increase in fuel consumption. Also, the separator 10 has a fixed geometry, such that in order to alter or adjust performance of the separator 10, the separator 10 needs to be redesigned and remanufactured. The redesign and remanufacturing of the separator 10 results in additional costs. Additionally, being that the separator 10 is rigid the separator is unable to compensate for changing contamination conditions, thereby limiting performance characteristics of the separator 10.

There is a continuous effort to improve the functionality and efficiency of aeronautical vehicles. Therefore, it would be desirable to provide an improved method and apparatus for separating particles from an induced fluid within an aeronautical vehicle engine. The method and apparatus should provide the ability to adjust particle separation efficiency and pressure loss of the separator.

SUMMARY OF THE INVENTION

The foregoing and other advantages are provided by a method and apparatus for separating particles from an induced fluid within an vehicle engine. An inertial inlet particle separator system for an aeronautical vehicle engine is provided. The system includes a particle sensor that generates a contamination signal. An inertial inlet particle separator is also included in the system and has a fluid parameter adjusting system mechanically coupled within the inertial inlet particle separator. A controller is electrically coupled to the particle sensor and the fluid parameter adjusting system. The controller adjusts a fluid parameter of the inertial inlet particle separator in response to the contamination signal. A method of performing the same is also provided.

One of several advantages of the present invention is that it provides an improved apparatus and method for separating particles from an induced fluid within an aeronautical vehicle engine by providing an ability to adjust fluid parameters within the inertial inlet particle separator in response to a contamination level. The aforementioned allows for relatively high efficiency of fuel consumption and high power during low induced fluid contamination levels and relatively high engine protection during high contamination levels.

Another advantage of the present invention is that it provides flexibility in the manner as to which the fluid parameters are adjusted including altering channel wall shape, splitter length, clean fluid intake opening size, and various other alterable fluid parameters. The flexibility allows for increased fine-tuning of efficiency and power.

Furthermore the present invention allows for fluid flow adjustments during multiple operating speeds of travel. Adjustable fluid flow allows the amount of fluid being discharged to be limited at higher travel speeds, which increases power and decreases fuel consumption when because of inertial effects typically a larger portion of the induced fluid tends to be discharged. Also, adjustable fluid flow allows the present invention to increase fluid flow into an intake portion of an engine and maintain power, rather than experiencing a reduction in power due to a higher contaminated equivalent fluid flow.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein:

FIG. 1 is a quarter cross-sectional view of a traditional inertial inlet particle separator;

FIG. 2 is a side view of an aeronautical vehicle having a turboshaft engine that utilizes an inertial inlet particle separator system in accordance with an embodiment of the present invention;

FIG. 3 is a cross-sectional view of the turboshaft engine utilizing the inertial inlet particle separator system in accordance with an embodiment of the present invention;

FIG. 4 is a quarter cross-sectional view of an inertial inlet particle separator in accordance with an embodiment of the present invention; and FIG. 5 is a logic flow diagram illustrating a method of separating particles from an induced fluid within an aeronautical vehicle engine.

DETAILED DESCRIPTION OF THE PREFERRED EMBODIMENT

In each of the following figures, the same reference numerals are used to refer to the same components. While the present invention is described with respect to a method and apparatus for separating particles from an induced fluid within an aeronautical vehicle engine, the present invention may be adapted to be used in various systems including: automotive vehicle systems, control systems, aeronautical vehicle systems, or other applications requiring the separation of particles within a fluid. The aeronautical vehicle systems may include: a turboshaft engine, a turbine engine, or a turboprop engine. The aeronautical vehicles may include helicopters, planes, or aircraft having fixed wing or tilt wing configurations or tilt rotor configurations.

In the following description, various operating parameters and components are described for one constructed embodiment. These specific parameters and components are included as examples and are not meant to be limiting.

Also, in the following description the terms "contaminated fluid" and "clean fluid" are terms used to distinguish between a fluid that is relatively dirty as compared to another fluid that is relatively clean. The present invention separates an induced fluid into a contaminated fluid and a clean fluid. The contaminated fluid has larger particles, a larger number of particles, or a combination thereof as compared to the clean fluid.

Additionally, although the present invention is described with respect to an inertial inlet particle separator system operating in air and therefore separating contaminated air from clean air, the present invention may be applied to inertial particle separators operating in or utilizing other fluids. For example, a fluid may be in the form of a liquid rather than air.

Figure 1:
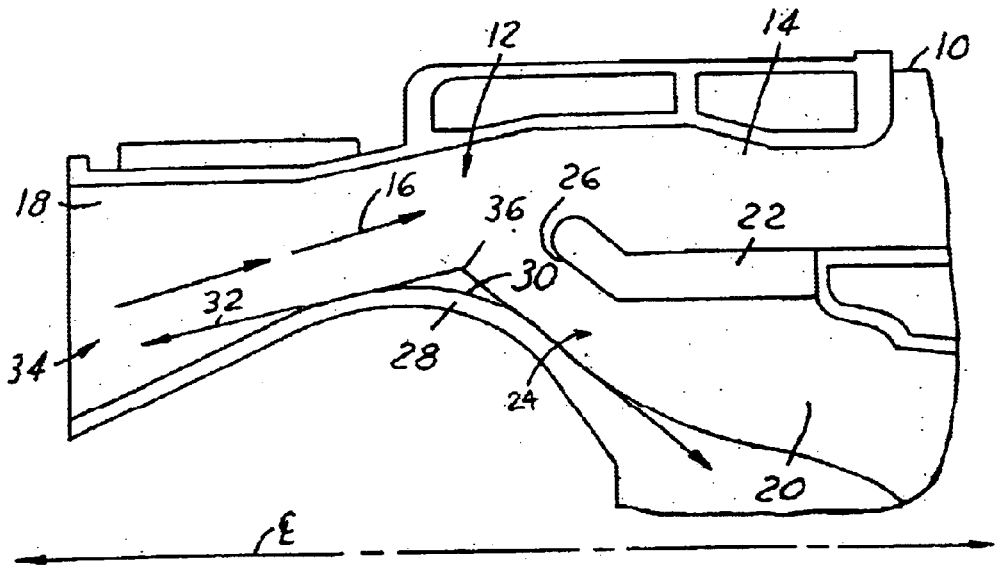
Figure 2:
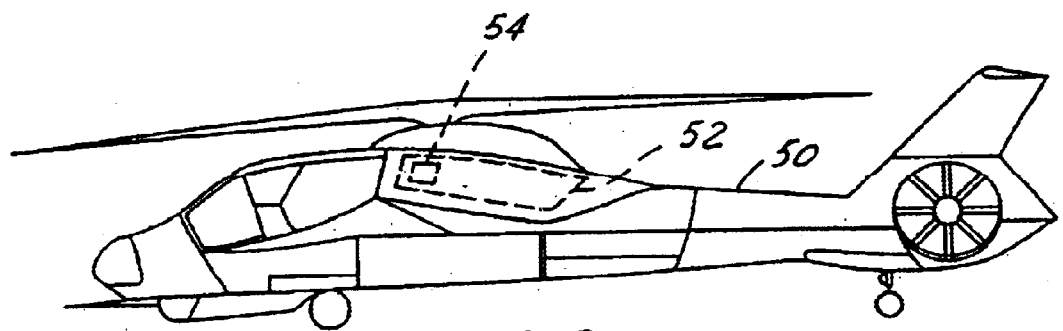

Referring now to FIG. 2, a side view of an aeronautical vehicle 50 having a turboshaft engine 52 that utilizes an inertial inlet particle separator system 54 in accordance with an embodiment of the present invention is shown. The engine 52 compresses atmospheric air to elevate the air pressure, adds heat, and exhausts the compressed high pressure air through a series of turbines (not shown). The turbines extract work from the high pressure air, which in turn propels vehicle 50. Typically, air is induced into the engine 52 under ambient conditions and is exhausted from the engine 52 at ambient conditions. When air is induced at lower pressures than ambient the engine works harder to produce the same amount of power that is created at ambient pressures. The increase in work results in increased fuel consumption. The system 54 efficiently separates induced fluid into contaminated fluid and clean fluid for various contamination conditions to minimize loss in air pressure and minimize fuel consumption, which is further described in detail below.

Figure 3:
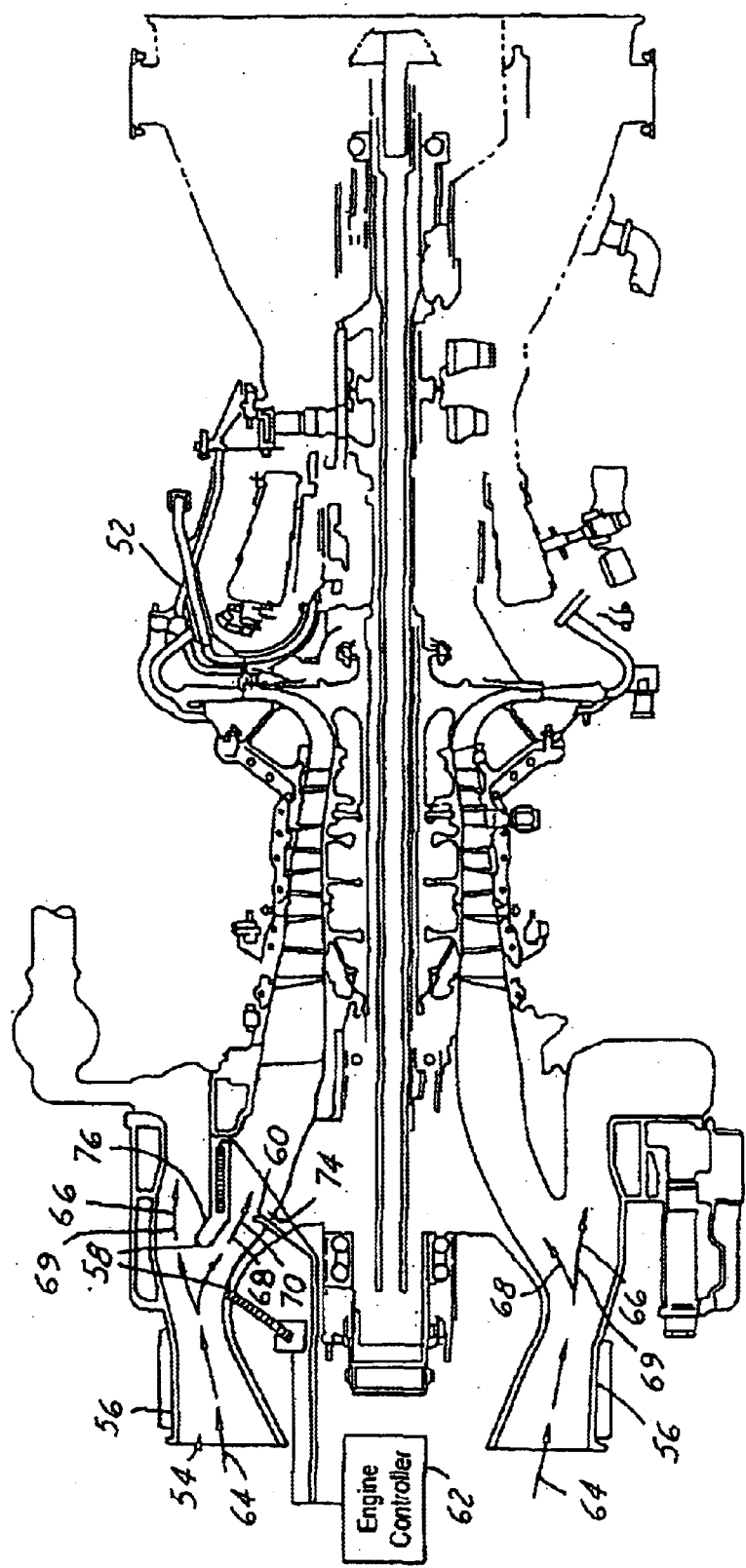

Referring now to FIG. 3, a cross-sectional view of the engine 52 utilizing the system 54 in accordance with an embodiment of the present invention is shown. The system 54 includes an inertial inlet particle separator 56 having a fluid parameter adjusting system 58, a particle sensor 60, and an engine controller 62. Induced air, represented by arrows 64, enters the separator 56 and is split into a contaminated fluid 66 and a clean fluid 68 by the parameter adjusting system 58. The contaminated fluid 66 follows a contaminated fluid flow path 69 and the clean fluid 68 follows a clean fluid flow path 70. The sensor 60 determines the contamination level of the clean fluid 68 and generates a contamination signal. The controller 62 signals the parameter adjusting system 58 to adjust a clean fluid parameter in response to the contamination signal. The adjustment of a clean fluid parameter alters the amount of contaminated fluid 66 that is filtered from the induced fluid 64 and discharged from the engine 52 versus being used by the engine 52 to generate power.

A clean fluid parameter may include adjusting a fluid pressure, a fluid flow path, or a fluid volume. A clean fluid parameter may also include adjusting a fluid channel characteristic such as: a fluid inlet opening size, a fluid inlet shape, a fluid inlet orientation, a channel wall shape, a channel wall size, or various other channel characteristics known in the art. Although, the present invention is described as adjusting a clean fluid parameter an induced fluid parameter, a contaminated fluid parameter, or other fluid parameter may be adjusted.

The sensor 60 may be a side optical device, a laser doppler velocimetry device, a laser two focus velocimetry device, a thermocouple, a "sand sniffer" in combination with a particle analyzer, or other particle sensing device known in the art. The sensor 60 measures particle concentration in the clean fluid 68 and generates the contamination signal. The sensor 60 is coupled to the clean fluid channel 74 downstream of the splitter 76.

The controller 62 may be microprocessor based such as a computer having a central processing unit, memory (RAM and/or ROM), and associated input and output buses. The controller 62 may be a portion of a central vehicle main control unit, an engine control unit, an interactive vehicle dynamics module, or a stand-alone controller. The controller 62 may also be simply solid-state digital or analog logic devices.

Figure 4:
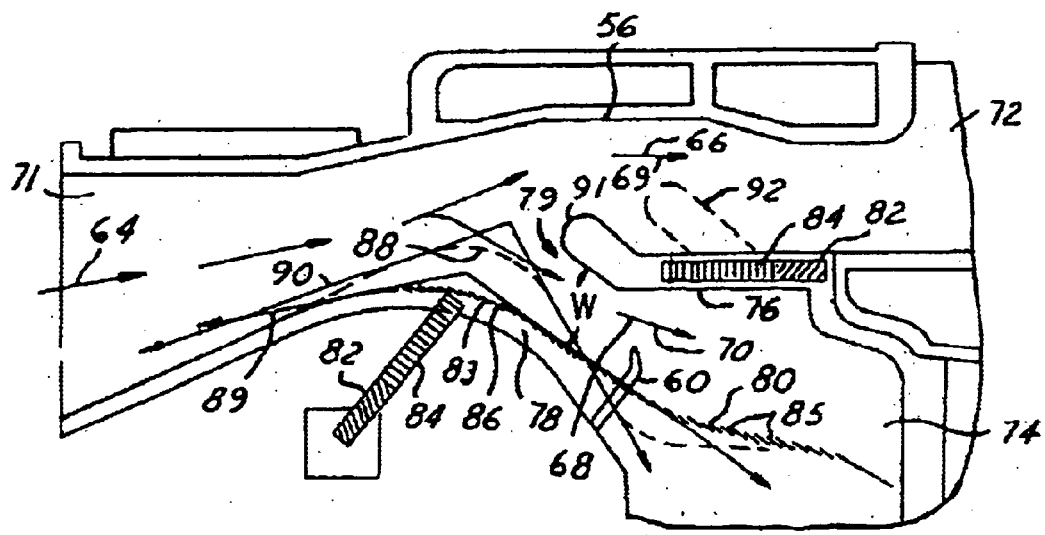

Referring now to FIGS. 4, a quarter cross-sectional view of the separator 56 in accordance with an embodiment of the present invention is shown. The separator 56 includes a fluid inlet 71, a scavenge channel 72, and a clean fluid channel 74. The induced fluid 64 enters the fluid inlet 71 and is divided by an adjustable splitter 76 into the contaminated fluid 66 and the clean fluid 68, which are guided into the scavenge channel 72 and the clean fluid channel 74, respectively. The clean fluid 68 flows over an adjustable hub 78 through a clean fluid intake opening 79 to the clean fluid channel 74. The clean fluid intake opening 79 has an inner width W, which may be altered when adjusting a clean fluid parameter.

Referring now to FIGS. 3 and 4, the parameter adjusting system 58 includes the splitter 76 and the hub 78. Both the splitter 76 and the hub 78 are manipulated via shape memory alloy actuators 82 and worm gears 84. The actuators 82 rotate turning the worm gears 84 and in turn translating the splitter 76 and repositioning the hub 78. Although, the present invention uses actuators 82 and worm gears 84 other mechanical devices known in the art may be used in adjusting the splitter 76 and the hub 78. The inner surface 83 of the hub 78, for this illustrated embodiment, includes a series of plates 85. As the worm gear is rotated, the series of plates 85 reorient themselves into different rigid shapes. The series of plates 85 are formed of lightweight rigid materials known in the art.

Both the adjustable splitter 76 and the adjustable hub 78 may have adaptive structures, as illustrated by surface 80 to allow for adjusting a clean fluid parameter. Adaptive structures may be of various form. One embodiment of the present invention is as shown, where the actuators 82 contain adaptive structures, which in this stated embodiment are shaped memory alloys. Heat is applied at to the shape memory alloys, causing the alloys to change shape thereby turning the worm gears 84 and translating or reorienting the splitter 76 and the hub 78. Various other adaptive structure embodiments may be applied such as piezo-electric devices rather than shape memory alloys, which have a faster response time and a smaller throw. Another example, is to replace the series of plates 85 with adaptive structures such as the shape memory alloys and apply electrical current or heat directly to the hub 86 without using the actuators 82 and worm gears 84. Adaptive structures may therefore be utilized in translating and reorienting the splitter 76 and the hub 78 as stated above or by using other adaptive structure methods known in the art.

Although the parameter adjusting system 58 is described as including the splitter 76 and the hub 78, the system 58 may include only one of the above or may include other similar fluid parameter adjusting apparatuses, as to be able to adjust a fluid parameter within an inertial inlet particle separator.

The hub 78 has a variable geometry in that it forms various curved surfaces within the separator 56. For example, the hub 78 may be reoriented from a first position 86 to a second position 88. In the first position 86 fluid flows over the hub 78 around a radius having a tangential angle 89 versus around a radius having a tangential angle 90 for the second position 88. When the hub 78 is in the first position 86 versus the second position 88 there is a lower separation efficiency and lower loss exhibited, being that the width W is smaller. The amount of fluid entering the clean fluid channel 74 is restricted since the fluid has a more acute angled hub to pass around and a smaller opening 79 to enter.

The splitter 76 may be translated in a fore or aft direction. For example, the splitter 76 may be translated from a fore position 91 to an aft position 92. The translation of the splitter 76 alters the size of the width W. In the fore position 91, the width W is small, therefore reducing the amount of contaminants flowing into the clean fluid channel, as preferred in high contamination conditions. High contamination conditions may include vehicle take off, hot refueling, and low altitude hover and cruise periods. In the aft position 92, the width W is relatively larger, allowing increased fluid flow into the clean fluid channel, as in low contamination conditions. Low contamination conditions may include hovering at a relatively high distance above ground level, taking off and landing on prepared runways, or during normal cruising periods. Although, the splitter 76 is illustrated as being translated in a fore or aft direction, the splitter may be translated in other directions.

Referring now to FIG. 5, a logic flow diagram illustrating a method of separating particles from an induced fluid 64 within the engine 52, is shown.

In step 100, a fluid is induced into the separator 56. The fluid is typically air from the atmosphere as described above containing particles such as sand or dust.

In step 102, a contaminated portion, the contaminated fluid 66, of the induced fluid 64 is inertially guided into the scavenge channel 72.

In step 104, a clean fluid portion, the clean fluid 68, of the induced fluid 64 is guided into the clean fluid channel 74.

In step 106, the particle sensor 60 determines a contamination level of the clean fluid 68 and generates the contamination signal. Particle sensor 60 generates the contamination signal in response to the quantity and size of particles entering the clean fluid intake opening 79. When the particle sensor 60 is used in a different location within the separator 56, of course, other quantities would be measured.

In step 108, the controller 62 adjusts a clean fluid parameter in response to the contamination signal. Controller generates a particle description signal. The controller 62, in response to the particle description signal determines whether to translate the splitter 76 or reorient the hub 78. Upon adjusting the clean fluid parameter the controller 62 returns to step 100. In returning back to step 100 the system 14 is performing as a feed-back system as to continuously regulate and adjust a clean fluid parameter, thereby maximizing efficiency for ever changing contamination levels.

The present invention provides an apparatus and method of separating particles in an induced fluid of an engine. The present invention allows for continuous fluid parameter adjustments as to provide fuel efficiency and minimize the amount of contamination entering a vehicle engine. In so doing, minimizing degradation of engine componentry and maximizing power and range of operation in various contamination leveled conditions.

The above-described apparatus, to one skilled in the art, is capable of being adapted for various purposes and is not limited to the following systems: automotive vehicle systems, control systems, aeronautical vehicle systems, or other applications requiring the separation of particles within a fluid. The above described invention may also be varied without deviating from the spirit and scope of the invention as contemplated by the following claims.

What is claimed is:

1. An inertial inlet particle separator system for a vehicle engine comprising:

a particle sensor generating a contamination signal;

an inertial inlet particle separator;

a fluid parameter adjusting system mechanically coupled within said inertial inlet particle separator; and a controller electrically coupled to said particle sensor and said fluid parameter adjusting system, said controller causing a fluid parameter of said inertial inlet particle separator to change in response to said contamination signal.

2. A system as in claim 1 wherein causing a fluid parameter to change comprises causing an induced fluid parameter, a contaminated fluid parameter, or a clean fluid parameter to change.

3. A system as in claim 1 wherein causing a fluid parameter to change comprises causing a fluid pressure, a fluid flow path, or a fluid volume to change.

4. A system as in claim 1 wherein causing a fluid parameter to change comprises causing a fluid channel characteristic of at least one of the following: a fluid inlet opening size, a fluid inlet shape, a fluid inlet orientation, a channel wall shape, or a channel wall size.

5. A system as in claim 1 wherein said fluid parameter adjusting system is an adjustable splitter or an adjustable hub.

6. A system as in claim 1 wherein said fluid parameter adjusting system comprises:

an adjustable splitter separating a contaminated fluid flow path from a clean fluid flow path; and a hub mechanically coupled to and within said inertial inlet particle separator;

said controller adjusting a clean fluid inlet opening, defined by said adjustable splitter and said hub, by translating said splitter relative to said hub in response to said contamination signal.

7. A system as in claim 6 wherein said adjustable splitter comprises adaptive structures.

8. A system as in claim 1 wherein said fluid parameter adjusting system comprises:
   an adjustable hub having a plurality of orientations and mechanically coupled to and within said inertial inlet particle separator;
   said controller adjusting a clean fluid flow path or a clean fluid inlet opening by reorienting said adjustable hub in response to said contamination signal.

9. A system as in claim 8 wherein changing said orientation of said adjustable hub comprises adjusting one of the following: adjustable hub size, adjustable hub shape, or adjustable hub position relative to a splitter.

10. A system as in claim 8 wherein said adjustable hub comprises adaptive structures.

11. A system as in claim 1 wherein said particle sensor is at least one of the following: a side optical device, a laser doppler velocimetry device, a laser two focus velocimetry device, or a thermocouple.

12. A system as in claim 1 further comprising:
   said controller determining size, speed, concentration and position of particles in a fluid within said inertial inlet particle separator in response to said contamination signal and generating a particle description signal; and
   said controller causing said fluid parameter to change in response to said particle description signal.

13. A system as in claim 12 wherein said clean fluid parameter adjusting system comprises:
   an adjustable splitter separating a contaminated fluid flow path from a clean fluid flow path; and
   a hub mechanically coupled to and within said inertial inlet particle separator;
   said controller adjusting a clean fluid inlet opening, defined by said adjustable splitter and said hub, by translating said splitter relative to said hub in response to said contamination signal.

14. A system as in claim 12 wherein said clean fluid parameter adjusting system comprises:
   an adjustable hub having a plurality of orientations and mechanically coupled to and within said inertial inlet particle separator;
   said controller adjusting a clean fluid flow path or a clean fluid inlet opening by reorienting said adjustable hub in response to said contamination signal.

15. A system as in claim 14 wherein said adjustable hub comprises adaptive structures.

16. A vehicle propulsion system for a vehicle comprising:
   an engine;
   an inertial inlet particle separator system comprising;
   a particle sensor generating a contamination signal;
   an inertial inlet particle separator;
   a clean fluid parameter adjusting system mechanically coupled within said inertial inlet particle separator; and
   a controller electrically coupled to said particle sensor and said fluid parameter adjusting system, said controller causing a fluid parameter of said inertial inlet particle separator to be adjusted in response to said contamination signal;
   said engine propelling the vehicle.

17. A method of separating particles from an induced fluid within a vehicle engine comprising:
   determining a contamination level of a fluid within an inertial inlet particle separator of the engine and generating a contamination signal; and
   causing a fluid parameter of said inertial inlet particle separator to change in response to said contamination signal.

18. A method as in claim 17 wherein causing a fluid parameter to change comprises translating a splitter within said inertial inlet particle separator.

19. A method as in claim 17 wherein causing a fluid parameter to change comprises reorienting a hub within said inertial inlet particle separator.

20. A method as in claim 17 further comprising:
   inertially guiding a contaminated fluid portion of said induced fluid into a scavenge channel;
   guiding a clean fluid portion of said induced fluid into a clean fluid intake channel;
   determining a contamination level of said contaminated fluid portion or a contamination level of said clean fluid portion and generating said contamination signal; and
   causing said fluid parameter to change in response to said contamination signal.

21. A method as in claim 17 further comprising:
   determining size, speed, concentration and position of particles in a fluid within said inertial inlet particle separator in response to said contamination signal and generating a particle description signal; and
   causing said fluid parameter to change in response to said particle description signal.

* * * * *